(12) United States Patent
Folliot et al.

(10) Patent No.: US 11,500,767 B2
(45) Date of Patent: Nov. 15, 2022

(54) METHOD AND DEVICE FOR DETERMINING A GLOBAL MEMORY SIZE OF A GLOBAL MEMORY SIZE FOR A NEURAL NETWORK

(71) Applicant: STMicroelectronics (Rousset) SAS, Rousset (FR)

(72) Inventors: Laurent Folliot, Gourdon (FR); Pierre Demaj, Nice (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 313 days.

(21) Appl. No.: 16/810,546

(22) Filed: Mar. 5, 2020

(65) Prior Publication Data

US 2020/0302278 A1    Sep. 24, 2020

(30) Foreign Application Priority Data

Mar. 20, 2019  (FR) .................................. 1902855

(51) Int. Cl.
  *G06F 21/00*  (2013.01)
  *G06F 12/02*  (2006.01)
(52) U.S. Cl.
  CPC ................ *G06F 12/0246* (2013.01)
(58) Field of Classification Search
  CPC .................................................. G06F 12/0246
  USPC ........................................................... 706/15
  See application file for complete search history.

(56) References Cited

U.S. PATENT DOCUMENTS

| | | | |
|---|---|---|---|
| 5,317,675 A | * | 5/1994 | Ikehara ................ G06K 9/6274 706/31 |
| 2017/0161604 A1 | | 6/2017 | Craddock et al. |
| 2018/0088996 A1 | | 3/2018 | Rossi et al. |
| 2018/0136912 A1 | | 5/2018 | Venkataramani et al. |
| 2018/0285715 A1 | | 10/2018 | Son et al. |

(Continued)

FOREIGN PATENT DOCUMENTS

FR    3089649 A1    6/2020

OTHER PUBLICATIONS

Siu, Kevin et al, "Memory Requirements for Convolutional Neural Network Hardware Accelerators", IEEE International Symposium on Workload Characterization (IISWC), Sep. 30-Oct. 2, 2018, 11 pages.

(Continued)

*Primary Examiner* — Josnel Jeudy
(74) *Attorney, Agent, or Firm* — Slater Matsil, LLP

(57) ABSTRACT

In accordance with an embodiment, a method for determining an overall memory size of a global memory area configured to store input data and output data of each layer of a neural network includes: for each current layer of the neural network after a first layer, determining a pair of elementary memory areas based on each preceding elementary memory area associated with a preceding layer, wherein: the two elementary memory areas of the pair of elementary memory areas respectively have two elementary memory sizes, each of the two elementary memory areas are configured to store input data and output data of the current layer of the neural network, the output data is respectively stored in two different locations, and the overall memory size of the global memory area corresponds to a smallest elementary memory size at an output of the last layer of the neural network.

24 Claims, 8 Drawing Sheets

(56) References Cited

U.S. PATENT DOCUMENTS

| | | |
|---|---|---|
| 2019/0042925 A1 | 2/2019 | Choe et al. |
| 2019/0156185 A1 | 5/2019 | Li et al. |
| 2019/0196970 A1 | 6/2019 | Han et al. |
| 2020/0175373 A1* | 6/2020 | Demaj .................. G06N 3/04 |
| 2020/0183834 A1 | 6/2020 | Folliot et al. |
| 2020/0257972 A1 | 8/2020 | Miniskar et al. |
| 2022/0114133 A1* | 4/2022 | Liu ...................... G06F 15/76 |

OTHER PUBLICATIONS

Erdeljan, Andrea, et al., "IP Core for Efficient Zero-Run Length Compression of CNN Feature Maps", 25th Telecommunications forum TELFOR 2017, Serbia, Belgrade, Nov. 21-22, 2017, 4 pages.

* cited by examiner

[Fig 1]
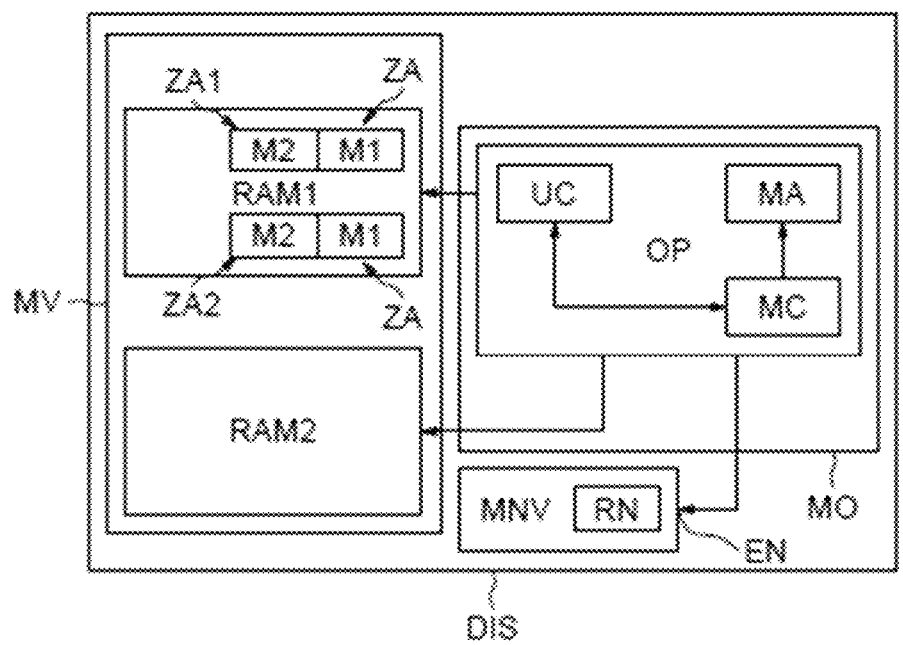

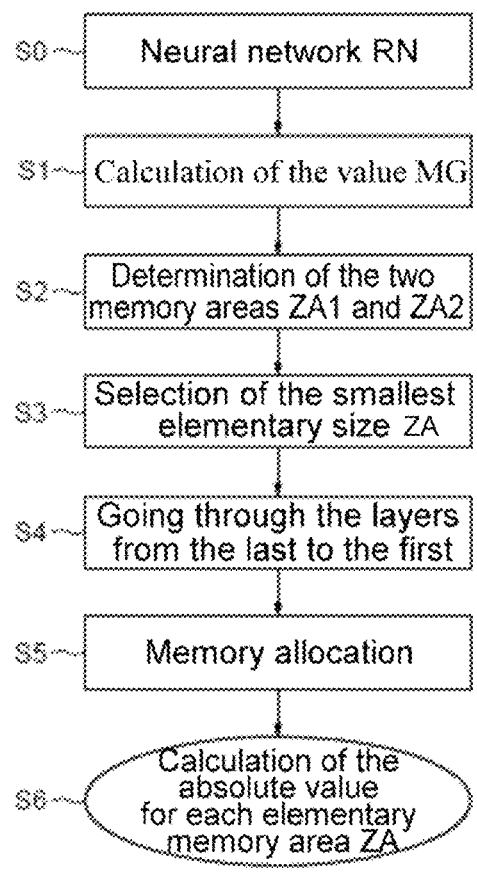
[Fig 2]

[Fig 3]
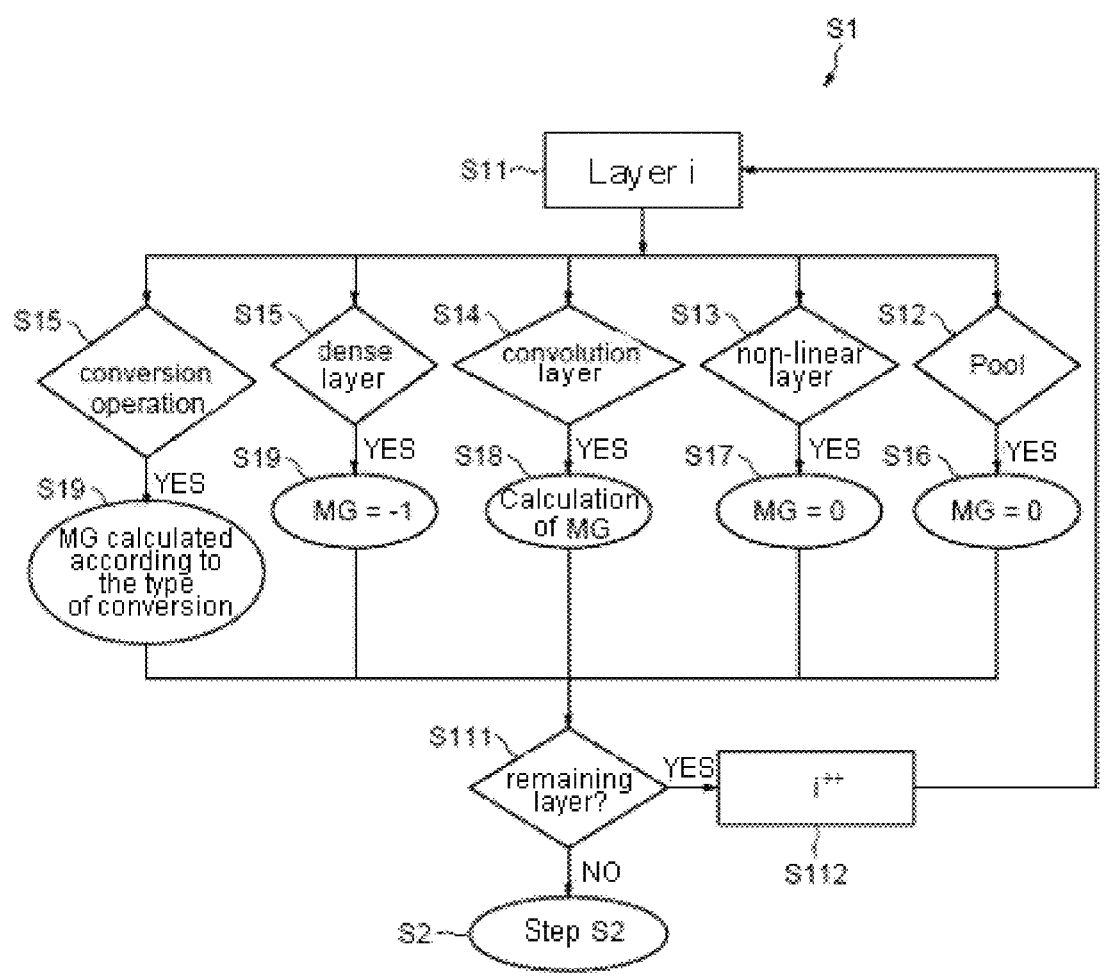

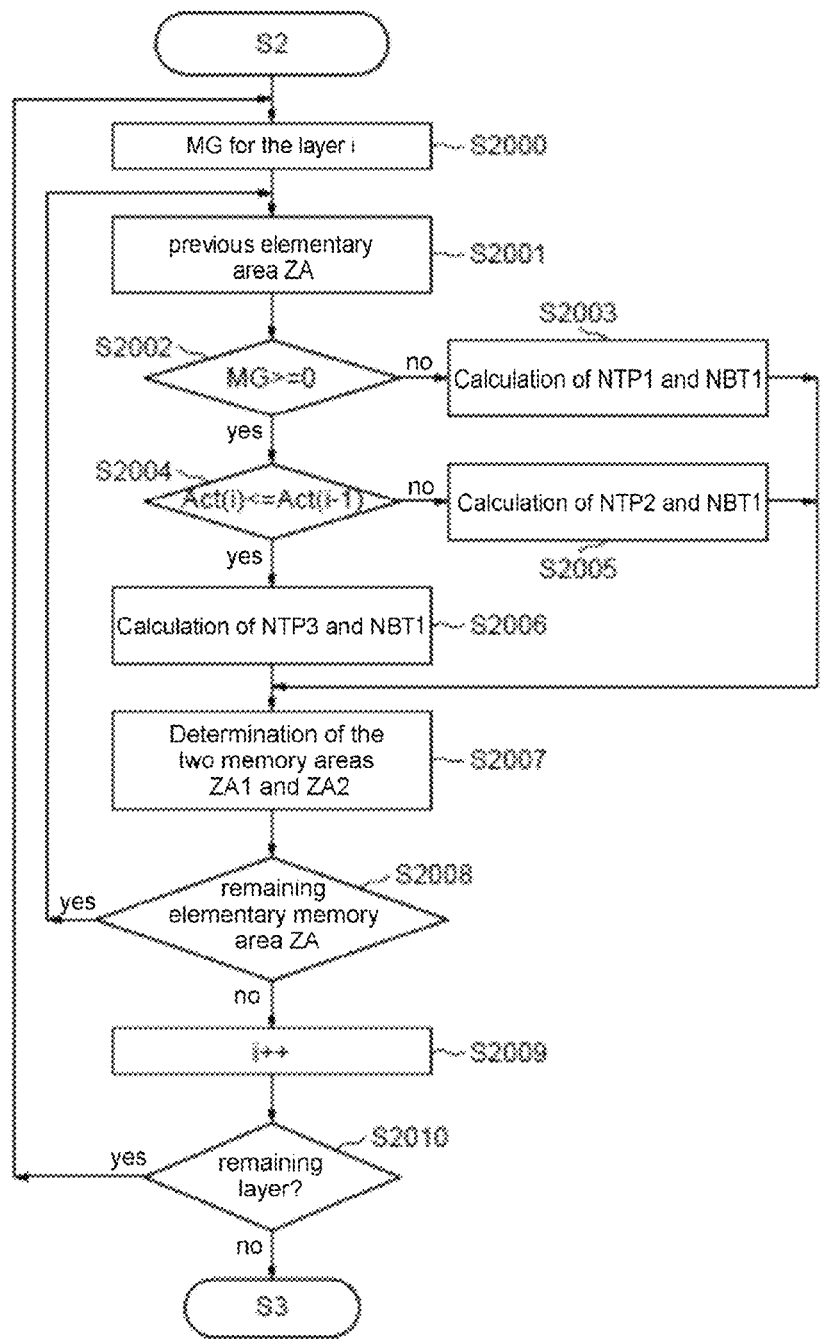
[Fig 4]

[Fig 5A]
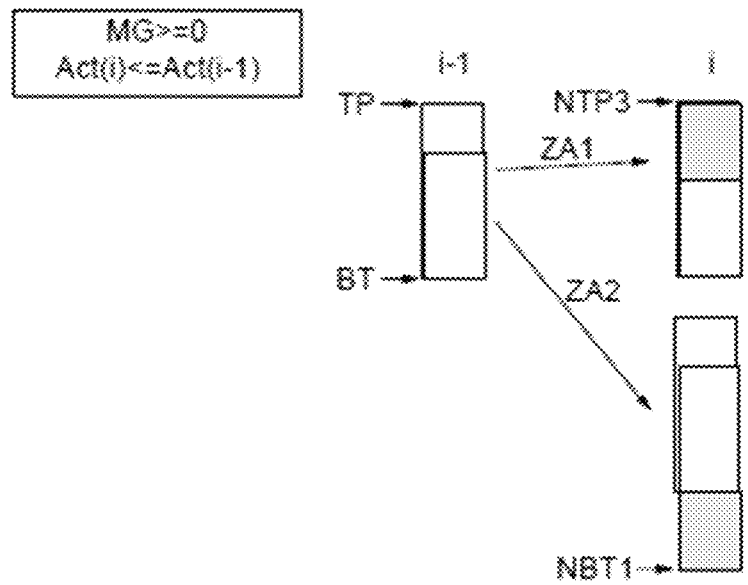
[Fig 5B]
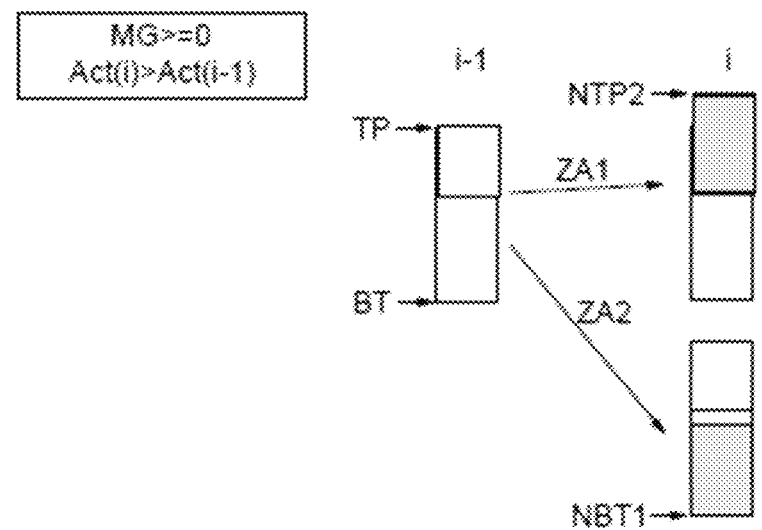

[Fig 5C]
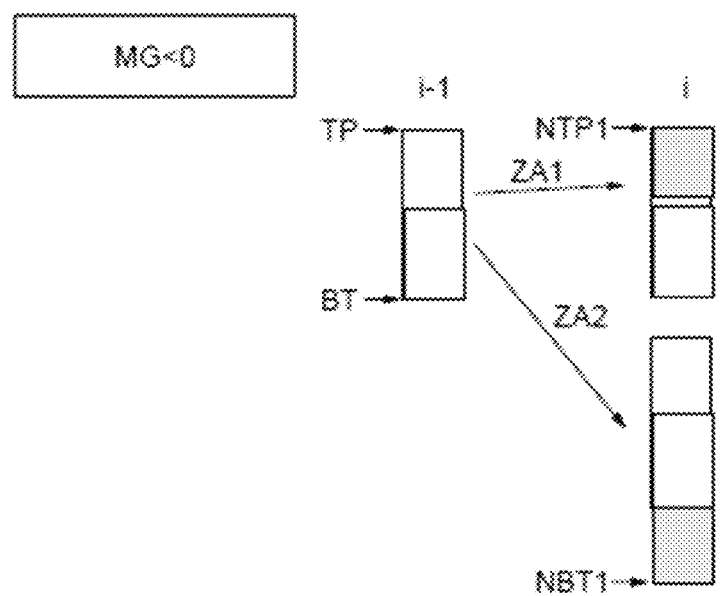

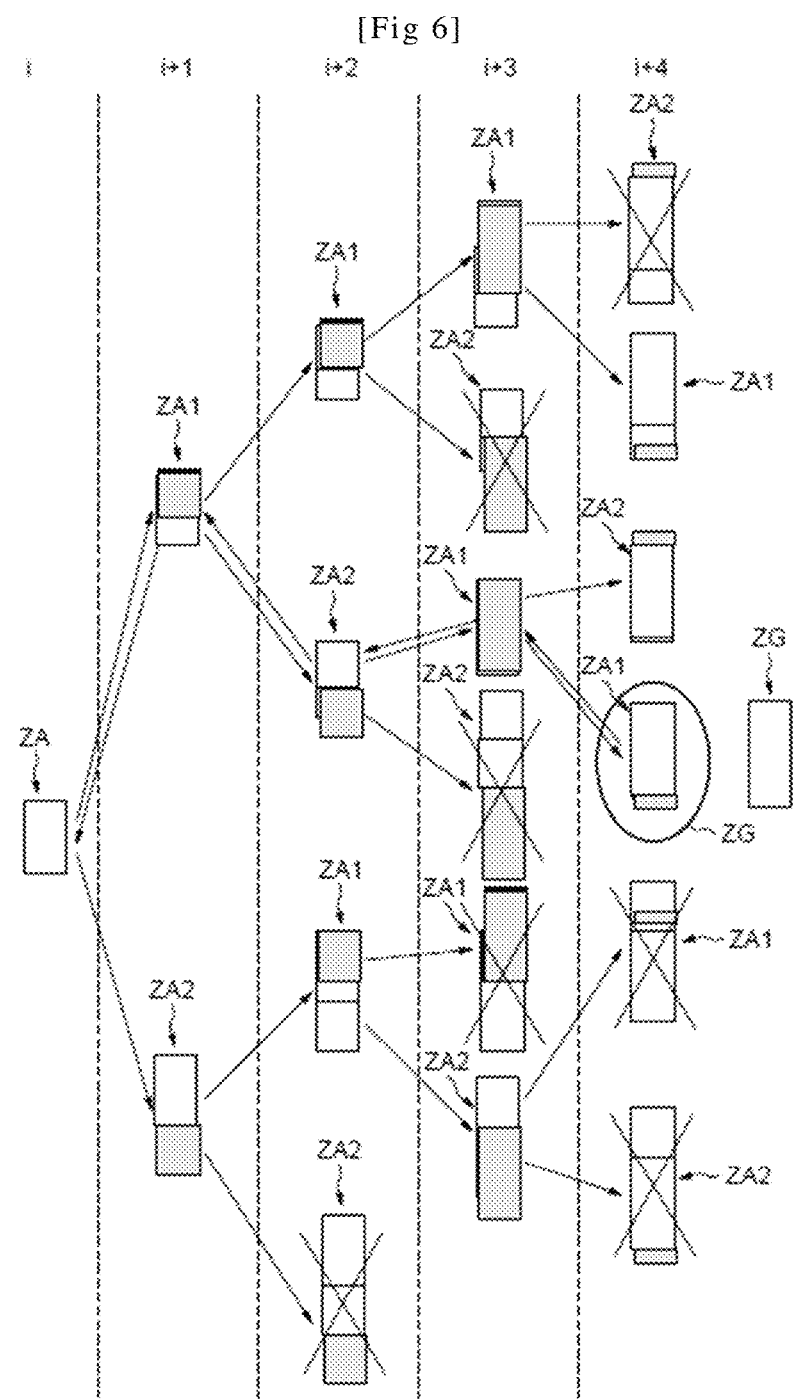
[Fig 6]

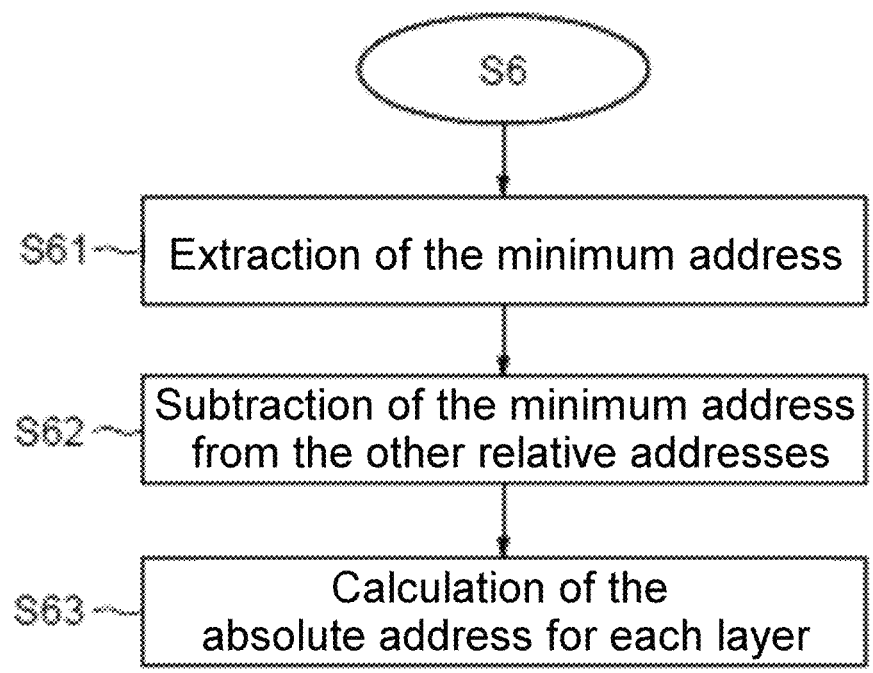
[Fig 7]

METHOD AND DEVICE FOR DETERMINING A GLOBAL MEMORY SIZE OF A GLOBAL MEMORY SIZE FOR A NEURAL NETWORK

This application claims priority to French Patent Application No. 1902855, filed on Mar. 20, 2019, which application is hereby incorporated herein by reference in its entirety.

TECHNICAL FIELD

Embodiments of the present invention are directed to a method and device of determining a global memory size for a neural network.

BACKGROUND

Neural networks are massively used for solving various statistical problems, notably the problem of the classification of data.

After an automatic learning phase, generally supervised, in other words on an already classified reference database, a neural network "learns" and becomes capable on its own of applying the same classification to unknown data.

Convolutional neural networks (or CNN) may for example be mentioned which are a type of neural network in which the pattern of connections between the neurons is inspired by the visual cortex of animals. They allow the efficient recognition of objects or of persons in images or videos.

A convolutional neural network generally contains four types of layer successively processing the information: a convolution layer which processes for example blocks of the image one after another; a non-linear layer which allows the relevance of the result to be improved; a pooling layer which allows several neurons to be grouped into a single neuron; and a fully-connected (or dense) layer which connects all the neurons of a layer to all the neurons of the preceding layer.

Each layer takes data as input and delivers output data (or "features") at the output, after processing by the layer. The convolution layer generally corresponds to a scalar product between the neurons of the preceding layer and the weight of the neural network. It constitutes the first layer of a convolutional neural network. "Weight", which is a term whose meaning in the field of neural networks is well known to those skilled in the art, is understood to mean parameters of neurons that are configurable for obtaining good output data.

The aim of the convolution layer is to identify the presence of a set of specific data in the images received at the input. For this purpose, a filtering is effected by convolution. The principle is to slide a window representing the data to be detected, and to calculate the convolution product between the window and each portion of the scanned image.

For each convolution product, output data is obtained that indicates where the specific data is situated on the image.

The pooling layer is often placed between two convolution layers. At its input, it receives the output data from the convolution layer to which a "pooling" operation is applied which consists in reducing the size of the data while at the same time preserving its significant features. It allows the number of parameters and of calculations in the network to be reduced, and the efficiency of the network is improved as a consequence.

The fully connected layer forms the last layer of a convolutional or non-convolutional neural network; it allows the data input into the neural network to be classified.

The typical architectures of neural networks stack a few pairs of convolution layers and non-linear layers then add a pooling layer and repeat this pattern until output data of a sufficiently small size is obtained, then finish with two fully connected layers.

Today, neural networks are becoming more complex and take up a significant space in memory.

Several types of volatile memory are compatible with the use of a neural network, for example a TCM (for "Tightly Coupled Memory") memory or a static volatile memory SRAM (for "Static Random Access Memory") or an external memory.

If the neural network needs a large memory, the system in which the neural network is implemented could combine several types of memory, for example the memory TCM with the external memory, slowing down the execution time of the network.

There accordingly exists a need to limit as far as possible, or to optimize, the memory size needed for the execution of the neural network.

The optimization of the memory size also leads to an optimization of the surface area of the system and to a reduction in its power consumption when the neural network is executed.

One solution described in the French Patent application, filed on the Dec. 6, 2018 under no 1872443, includes an optimization of the memory size for each elementary memory area allocated to each layer. In other words, the optimization is performed layer by layer independently of the topology of the neural network, which allows the memory size and, as a consequence, the execution time of the neural network to be reduced.

SUMMARY

In accordance with an embodiment, a method for determining an overall memory size of a global memory area to be allocated in a memory configured to store input data and output data of each layer of a neural network includes: for each current layer of the neural network after a first layer, determining a pair of elementary memory areas based on each preceding elementary memory area associated with a preceding layer, wherein: the two elementary memory areas of the pair of elementary memory areas respectively have two elementary memory sizes, each of the two elementary memory areas are configured to store input data and output data of the current layer of the neural network, the output data is respectively stored in two different locations, and the overall memory size of the global memory area corresponds to a smallest elementary memory size at an output of the last layer of the neural network.

In accordance with another embodiment, a device includes: an input configured to receive parameters defining successive layers of a neural network; and a processor coupled to the input and to a memory. The processor configured to: determine an overall memory size of a global memory area to be allocated in the memory, wherein the memory is configured to store input data and output data of each layer of the neural network, determine, for each layer after a first layer of the neural network, a pair of elementary memory areas based on each preceding elementary memory area associated with a preceding layer, where two elementary memory areas of the pair of elementary memory areas respective have a first memory size and a second elementary memory size, the two elementary memory areas of the pair of elementary memory areas are each configured to store input data and output data, the output data from the each layer is stored in two different locations, and an overall memory size corresponding to a smallest elementary memory size at an output of the last layer of the neural network.

In accordance with a further embodiment, a device includes means for receiving parameters defining successive layers of a neural network; a memory; means for determining an overall memory size of a global memory area to be allocated in the memory, where the memory is configured to store input data and output data of each layer of the neural network; and means for determining, for each layer after a first layer of the neural network, a plurality of memory areas based on a memory area associated with a preceding layer, wherein each memory area of the plurality of memory areas has a corresponding memory size, and an overall memory size of the global memory corresponds to a smallest memory size of a memory area of the plurality of memory areas at an output of a last layer of the neural network.

BRIEF DESCRIPTION OF THE DRAWINGS

Other advantages and features of the invention will become apparent upon reading the detailed description of non-limiting embodiments and their implementation, and from the appended drawings in which:

FIG. 1 illustrates schematically one embodiment of the invention;

FIG. 2 illustrates schematically one embodiment of the invention;

FIG. 3 illustrates schematically one embodiment of the invention;

FIG. 4 illustrates schematically one embodiment of the invention;

FIG. 5A illustrates schematically one embodiment of the invention;

FIG. 5B illustrates schematically one embodiment of the invention;

FIG. 5C illustrates schematically one embodiment of the invention;

FIG. 6 illustrates schematically one embodiment of the invention; and

FIG. 7 illustrates schematically one embodiment of the invention.

DETAILED DESCRIPTION OF ILLUSTRATIVE EMBODIMENTS

Embodiments of the invention and their implementation relate to neural networks, for example deep, notably "deep learning", neural networks, and more particularly to the determination of the overall memory size of a global memory area to be allocated in a memory intended to store input data and output data of each layer of a neural network.

It has been observed by the inventors that the reduction in the size of memory as a function of the architecture of the neural network can allow the internal memory only to be used, thus significantly decreasing the execution time of the neural network. Thus, one embodiment and its implementation is aimed at optimizing the memory size needed for the execution of the network according to the topology of the network, with the aim of having a memory size adapted to the whole network rather than to each layer.

According to one aspect, a method is provided for determining the overall memory size of a global memory area to be allocated in a memory intended to store input data and output data of each layer of a neural network.

The method comprises, for each current layer of the network after the first layer, a determination of a pair of elementary memory areas based on each preceding elementary memory area associated with the preceding layer.

The two elementary memory areas of the pair have respectively two elementary memory sizes and are both intended to store input data and output data of the layer, the output data being respectively stored in two different locations.

The overall memory size corresponds to the smallest elementary memory size at the output of the last layer.

The input and output data are stored in elementary memory areas associated with each layer after the first layer. These elementary memory areas are advantageously in the RAM memory.

For each layer after the first layer, two elementary memory areas are determined each storing the same input and output data. Only the location of the output data differs between the two elementary memory areas.

These two different locations lead to two different elementary memory sizes where one of the two will be more advantageous for the optimization of the overall memory of the neural network.

At the output of the last layer, a plurality of elementary memory areas having different elementary memory sizes is obtained. The smallest elementary size amongst these elementary memory sizes will be selected to represent an overall memory size of a global memory area.

"Global memory area" is for example understood to mean a memory area able to store the input and output data from all of the elementary memory areas from which the elementary memory area having the smallest elementary size at the output of the last layer results.

Thus, the choice of the size of the global memory area is made after having gone through all the layers of the neural network.

According to one embodiment, it is possible, for example depending on the type of layer, for at least one of the two elementary memory sizes to be greater than or equal to the sum of the memory sizes for the input and output data of the layer.

As far as the first layer is concerned, two variants are possible depending on whether the initial data undergoes or does not undergo a modification processing.

Thus, according to one embodiment, the method comprises an initial processing of the initial input data of the neural network and, in this case, there is associated with the first layer a single elementary memory area designed to store the processed initial data corresponding to the input data for the second layer. "Initial processing" is for example understood to mean a conditioning of the initial data or a filtering by convolution or, more generally, any operation modifying the initial data. The two elementary memory areas then appear, in this case, from the second layer onwards.

According to another embodiment, corresponding to the absence of initial processing on the initial data, the first layer is associated with a pair of elementary memory areas determined starting from a memory area or buffer memory containing the initial input data of the neural network.

The two elementary memory areas of the first layer are both intended to store input data and output data of the first layer, the output data of the first layer being respectively stored in two different locations.

Thus, in this case, since the first layer comprises two elementary memory areas, in the second layer, starting from these two elementary memory areas of the first layer, a pair of elementary memory areas is determined relating to each elementary memory area of the first layer.

According to one embodiment, the input and output data of at least one of the two elementary memory areas of each pair may be juxtaposed. The juxtaposition of the input and output data of one of the two elementary memory areas allows a better memory occupation to be obtained.

According to one embodiment, for each current layer after the first layer and potentially including the first layer (this is also true for the first layer when it is already also associated with two elementary memory areas), the determination of the two elementary memory sizes of the two elementary memory areas of each pair and the location of the output data in these two elementary memory areas depend at least on the type of the current layer. In other words, depending on the type of the layer, for example a convolution, dense, non-linear or pooling layer, and/or on the memory size for the input and output data, and/or on the location of the input data, two locations are chosen.

The two elementary memory areas may advantageously comprise, depending for example on the type of the layer, an additional memory area allowing a cramming of the useful data into each elementary memory area to be avoided.

According to one embodiment, for each current layer after the first layer and potentially including the first layer (this is also true for the first layer when it is already also associated with two elementary memory areas), the determination of the two elementary memory sizes of the two elementary memory areas of each pair and the location of the output data in these two elementary memory areas depend on the function associated with the current layer. For example, a conversion of the input data having a size of 16 bits to a size of 8 bits or 8 bits to 16 bits may be mentioned as a function.

The two elementary memory areas may also comprise, in this case depending on the type of the function associated with the current layer, an additional memory area allowing a cramming of the useful data into each elementary memory area to be avoided.

According to one embodiment, the method furthermore comprises, after the determination of the smallest elementary size at the output of the last layer, going through the layers of the network from the last layer to the first layer and where, for each layer, the relative address of each elementary memory area is extracted from the location of the determined global memory area, from which the global memory area results.

Going through layers from the last to the first layer may be carried out for example by the Viterbi algorithm known to those skilled in the art. Going through the layers may of course be carried out by any algorithm whose aim is to find the most probable sequence of elementary memory areas having produced the global memory area. When going through the layers, the algorithm extracts the relative address of each elementary area selected.

"Relative address" is understood to mean the offset in memory with respect to a fixed address relating to the location of the initial input data of the neural network. According to one embodiment, for each layer, the absolute address of each elementary memory area is determined based on each extracted relative address.

"Absolute address" is understood to mean the address of the location of the selected elementary memory area in the global memory area intended to store the input and output data of the neural network. According to one embodiment, for each current layer after the first layer, the N elementary memory areas associated with the current layer having the smallest memory sizes are conserved.

Without this selection, there would be a large number of elementary memory areas which might be difficult to manage. Restricting the number of elementary memory areas for each layer to N elementary memory areas allows not only the management of the latter to be facilitated, but also only the elementary memory areas leading to a good memory optimization for the neural network to be conserved. According to one embodiment, N is settable. N is for example set according to the complexity of the neural network and of the device executing it. A default value, for example 16, may also be assigned to it.

According to another aspect, a device is provided comprising an input designed to receive parameters defining the various successive layers of a neural network, and processing means coupled to the input and designed to determine the overall memory size of a global memory area to be allocated in a memory intended to store input data and output data of each layer of the neural network.

The processing means are configured for determining, for each layer after the first layer, a pair of elementary memory areas based on each preceding elementary memory area associated with the preceding layer, having respectively a first and a second elementary memory size and each being intended to store input data and output data of the layer, the output data being stored in two different locations, the overall memory size corresponding to the smallest elementary memory size at the output of the last layer of the neural network.

According to one embodiment, at least one of the two elementary sizes is greater than or equal to the sum of the memory size for the input and output data.

According to one embodiment, the processing means are configured for carrying out an initial processing of the initial input data of the neural network, a single elementary memory area being associated with the first layer comprising the processed initial data corresponding to the input data of the second layer.

According to one embodiment, the processing means are configured for associating a pair of elementary memory areas with the first layer determined from a memory area or buffer memory containing the initial input data of the neural network.

According to one embodiment, the processing means are configured so as to juxtapose the input data and the output data of at least one of the two elementary memory areas.

According to one embodiment, for each layer after the first layer and potentially including the first layer, the processing means are configured for determining the location of the output data of the two elementary memory areas depending at least on the type of the layer.

According to one embodiment, for each layer after the first layer and potentially including the first layer, the processing means are configured for determining the location of the output data of the two elementary memory areas according to the function associated with the layer.

According to one embodiment, after having determined the smallest elementary size at the output of the last layer, the processing means are configured for going through the layers of the neural network from the last layer to the first layer, and are configured so as to extract, for each layer, from the location of the determined global memory area, the relative address of each elementary memory area from which the global memory area results.

According to one embodiment, the processing means are configured so as to determine for each layer the absolute address of each elementary memory area based on each relative address extracted.

According to one embodiment, the processing means are configured so as to conserve, for each layer after the first layer, the N elementary memory areas associated with the layer having the smallest memory sizes. According to one embodiment, N is settable.

According to another aspect, a microcontroller is also provided comprising the device such as defined hereinbefore.

In FIG. 1, the reference DIS denotes a device, for example a microcontroller, a code generator or any other object that can contain an embedded software or hardware architecture. The device DIS may also be a module integrated into a computer.

The device comprises a volatile memory, for example a RAM (for "Random Access Memory") memory. Here, the volatile memory MV comprises a first memory RAM1 and a second memory RAM2. The volatile memory MV may of course comprise more than two memories.

The device DIS also comprises a non-volatile memory MNV comprising an input EN intended to receive the various parameters defining the architecture of a neural network RN, in other words the configuration of its layers and its weight.

The non-volatile memory MNV is also configured for receiving a series of instructions defining an algorithm, advantageously a Viterbi algorithm whose operation will be detailed hereinafter. The volatile memory MV is configured for storing, in one of the two memories RAM1 or RAM2, the input and output data for the current layer destined to occupy an elementary memory area ZA. The device DIS comprises a module MO configured for carrying out given actions.

The module MO comprises processing means OP configured for determining the overall memory size of a global memory area to be allocated comprising all of the elementary memory areas ZA selected according to the smallest elementary memory size ZA at the output of the last layer of the neural network RN, in the volatile memory MV.

For this purpose, the processing means OP are coupled to both memories RAM1 and RAM2, and are configured for determining, for each layer of the neural network after the first layer, a pair of elementary memory areas ZA1 and ZA2 having respectively a first and a second elementary memory size. The two elementary memory areas are intended to store input data and output data of the layer in two different locations in some embodiments.

The processing means OP comprise a calculation unit UC, control means MC and allocation means MA. The processing means OP are coupled to the non-volatile memory MNV via the input EN in order to allow the calculation unit UC to acquire the parameters relating to the layers and to the operations of the neural network RN. The calculation unit UC comprises for example a microprocessor configured for performing the calculations required for the determination of the two elementary memory sizes of the two elementary memory areas ZA1 and ZA2. The calculation unit UC is configured for sending the results of the calculations to the control means MC.

In various embodiments, the control means MC are configured for choosing depending on the calculation results, for each layer after the first layer, the two locations of the output data for each elementary memory area ZA1 and ZA2 and the overall memory size of the global memory area to be allocated comprising all of the elementary memory areas ZA selected as a function of the smallest elementary memory size ZA at the output of the last layer of the neural network RN.

The control means MC are coupled to the allocation means MA which are configured for allocating the global memory area comprising all of the elementary memory areas ZA thus selected after authorization of the control means MC. For making this selection, the calculation unit UC is configured for executing the algorithm whose instructions are stored in the non-volatile memory MV. The control means MC and allocation means MA may, for example, take the form of software modules within the microprocessor and/or of specific logic circuits.

FIG. 2 shows a flow diagram of the various steps leading to the determination and to the allocation of the overall memory size of the global memory area comprising all of the selected elementary memory areas ZA.

The step S0 comprises receiving the architecture of the neural network RN via the input RN so as to be stored in the non-volatile memory MNV.

The control means MC are configured for extracting the architecture, in other words the configuration of the layers, of the operations between the layers and of the weight of the neural network RN.

The control means MC are subsequently configured for sending the configuration of each layer, after the first layer, to the calculation unit UC configured for calculating a value MG associated with the type of the layer and/or with the operation carried out by the layer in the step S1.

The calculation is detailed in FIG. 3.

The value MG allows the possible locations of the output data M2 from the layer to be determined for the elementary memory areas ZA1 and ZA2 associated with the layer. The location of the input data M1 is initially determined. The calculated value MG also represents an additional memory size of the elementary memory area ZA.

The step S1 is repeated for all the layers after the first layer of the neural network RN.

In the step S2, the control means MC subsequently choose the two locations for each elementary memory area ZA1, ZA2. The step S2 will be detailed in the FIG. 4.

The determination of the two locations is also repeated for all the layers after the first layer of the neural network RN once the step S1 has ended.

The control means MC subsequently select, in the step S3, the overall memory size corresponding to the smallest elementary memory size ZA at the output of the last layer of the neural network RN.

In the step S4, the control means MC authorize the calculation unit UC to execute the algorithm, for example the Viterbi algorithm, for going through the layers of the neural network RN from the last layer to the first layer and extracting, for each layer, from the location of the determined global memory area, the relative address of each elementary memory area ZA from which the global memory area results.

"Relative address" is understood to mean the offset in memory with respect to a fixed address relating to the location of the initial input data of the neural network RN.

It is of course possible for the scanning of the layers to be carried out by any algorithm which has the aim of finding the most probable sequence of elementary memory areas that has produced the global memory area.

In the step S5, the control means MC authorize the allocation means MA to be allocated the global memory area having a size equal to the smallest elementary memory size ZA at the output of the last layer of the neural network.

Once the block of the global memory area has been allocated, the calculation unit UC is configured for calculating the absolute addresses of each elementary memory area ZA selected in the step S6.

"Absolute address" is understood to mean the address of the location of the elementary memory area selected in the global memory area intended to store the input and output data of the neural network.

The calculation is detailed in the FIG. 7.

FIG. 3 illustrates a detailed flow diagram of the step S1.

In the step S11, the configuration of each layer i after the first layer of the neural network RN is sent to the calculation unit UC.

If the layer i is in a dense layer (S15), the value MG will be equal to −1 in S19.

If the layer i is a convolution layer (S14), the value MG is calculated. It may be negative, positive or equal to 0 in S1b. The value MG is for example calculated according to the formula hereinbelow:

$$MG=(CEIL(CONV1\_PADX+1,CONV1\_STRIDEX)+CONV1\_OUT\_DIM\_X\times CEIL(CONV1\_PADY+1,CONV1\_STRIDEY))\times CONV1\_OUT\_CH),$$ in which:

CEIL is a function which allows a number to be rounded up to the next higher integer number.

CONV_PADX is a variable which represents the number of zeros added horizontally starting from the left.

CONV1_STRIDEX is a variable which represents the horizontal displacement pitch of the convolution kernel.

CONV1_OUT_DIM_X is a variable which represents the size of the output data for the horizontal dimension.

CONV1_STRIDEY represents the vertical displacement pitch of the convolution kernel.

CONV1_OUT_CH represents the number of output channels.

If the layer i is a non-linear layer (S13), the value MG is equal to 0 in S17 and if the layer is a pooling layer (S12), the value MG is also equal to 0 in S16.

The layer i may also be a "Soft Max" layer known to those skilled in the art. In this case, the value MG is also equal to 0.

If the layer i allows for example a conversion operation (S20) on the input data to be carried out, the value MG is also calculated in S21 according to the type of conversion.

For example, if it is a 16-bit to 8-bit conversion, the value MG is equal to 0. If it is an 8-bit to 16-bit conversion, the value MG is equal to the size of the input data.

If it is a 16-bit to 32-bit conversion, the value MG is equal to the size of the input data.

If it is an 8-bit to 32-bit conversion, the value MG is equal to 3 times the size of the input data, and if it is a conversion from 32 bits to 8 or 16 bits, the value MG is equal to 0.

The value MG is of course also determined according to other types of operations as long as they are detectable by the calculation unit UC.

During the step S111, the control means MC verify whether there are still any layers of the neural network RN to be processed.

If yes, in the step S112, the control means MC authorize the calculation unit UC to extract the configuration of one of the remaining layers. If no, the control means go to the step S2.

FIG. 4 illustrates a detailed flow diagram of the step S2.

For each layer i after the first layer of the neural network RN, the control means MC obtain the value MG calculated by the calculation unit UC at the step S2000.

At the step S2001, the control means MC acquire the data relating to the preceding elementary memory area ZA of the preceding layer i−1, in other words the locations of the output data which represent the input data for the layer i.

If there are at least two preceding elementary memory areas ZA, the control means MC start by acquiring the data relating to the elementary memory area ZA which has the smallest size and carry out the execution of instructions which will be described hereinafter.

These instructions are repeated for all the elementary memory areas of the layer i−1 and this is done by increasing order.

In the step S2002, the control means MC verify whether the value MG is greater than or equal to 0. If no, at the step S2003, the control means MC authorize the calculation unit UC to perform a first calculation of a first memory value NTP1 representative of the minimum address of the elementary memory area ZA1 and according to the following formula:

$$NTP1=MIN(TP,ZA\_TP-Act(i))$$

in which:

MIN represents the operation allowing the smallest value between the two arguments TP, ZA_TP−Act(i) to be retained, TP represents the minimum address of the preceding elementary memory area ZA of the layer i−1, ZA_TP represents the minimum address of the input data for the layer I; and Act(i) represents the size of the output data from the layer i.

The control means MC also authorize the calculation unit UC to carry out a second calculation of a second memory value NBT1 representative of the maximum address of the elementary memory area ZA2 and according to the following formula:

$$NBT1=MAX(BT,ZA\_BT+Act(i))$$

in which:

MAX represents the operation allowing the largest value between the two arguments BT and ZA_BT+Act(i−1) to be retained, BT is the maximum address of the preceding elementary memory area ZA of the layer i−1, ZA_BT represents the maximum address of the input data for the layer i; and Act(i) represents the size of the output data from the layer i.

The first and second memory values NTP1, NBT1 allow the two locations of the output data of the two zones memory ZA1 and ZA2 associated with the layer i to be determined.

If the value MG is greater than or equal to 0, the control means MC verify, at the step S2004, whether the memory size of the output data Act(i−1) from the layer i−1 is greater than or equal to the size of the output data Act(i) from the layer i.

If the memory size of the output data Act(i) from the layer i is strictly greater than the memory size of the output data Act(i−1) from the layer i−1, the control means go to the step S2005; if no, they go to the step S2006.

In the step S2005, the control means MC authorize the calculation unit UC to carry out a third calculation of a third memory value NTP2 representative of the minimum address of the elementary memory area ZA1 and according to the following formula:

$$NTP2=MIN(TP,ZA\_BT-Act(i)-MG(i))$$

in which:

MIN represents the operation allowing the smallest value between the two arguments TP, ZA_BT−Act(i)−MG(i) to be retained, TP represents the minimum address of the preceding elementary memory area ZA of the layer i−1, ZA_BT represents the maximum address of the input data for the layer i, Act(i) represents the size of the output data from the layer i; and MG(i) represents the additional size corresponding to the value MG.

The calculation unit UC also carries out here the second calculation of the second value NBT1 according to the same formula.

The second and third memory values NBT1, NTP2 allow the two locations of the output data of the two memory areas ZA1 and ZA2 associated with the layer i to be determined.

In the step S2006, the control means MC authorize the calculation unit UC to perform a fourth calculation of a fourth memory value NTP3 representative of the minimum address of the elementary memory area ZA1 and according to the following formula:

$$NTP3=MIN(TP,ZA\_TP-Act(i))$$

in which:

MIN represents the operation allowing the smallest value between the two arguments TP, ZA_TP−Act(i) to be retained, TP represents the minimum address of the preceding elementary memory area ZA of the layer i−1, ZA_TP represents the minimum address of the input data for the layer i; and Act(i) represents the size of the output data from the layer i.

In this step, the calculation unit UC also carries out the second calculation of the second value NBT1 according to the same formula.

The second and fourth memory values NBT1, NTP3 allow the two locations of the output data of the two memory areas ZA1 and ZA2 associated with the layer i to be determined.

From one of the steps S2003, S2005 or S2006, the control means MC subsequently go to the step S2007 in which, as a function of the results of the calculations, the control means MC determine the two locations ZA1 and ZA2.

Once this is done, in the step S2008, the control means MC verify whether there remains, in the layer i−1, any other elementary memory area ZA to be processed.

If yes, the control means MC return to the step S2001. If no, the control means MC increment the value I, at the step S2009, and verify, at the step S2010, whether there are layers remaining in the neural network RN.

If yes, the step S2000 is carried out in order to acquire the value MG of the new layer i. If no, the step S3 is carried out for determining the smallest elementary size at the output of the last layer.

FIGS. 5A to 5C show examples of the locations of the output data of the two elementary memory areas ZA1 and ZA2.

For example, in FIG. 5A, the value MG is greater than or equal to 0 and the size of the output data Act(i) of the layer i is smaller than the size of the output data Act(i−1) of the preceding layer i−1.

The control means MC determine a first and a second location for the output data of the two elementary memory areas ZA1 and ZA2 as illustrated.

The size of the output data from the layer i does not exceed the upper limit provided by the fourth memory value NTP3 in the elementary memory area ZA1.

Nor does the size of the output data from the layer i go below the lower limit provided by the first memory value NBT1 in the elementary memory area ZA2.

Consequently, the input and output data of the elementary memory area ZA2 are juxtaposed which allows a better memory occupation to be obtained. The size of elementary memory area ZA2 here is greater than the sum of the sizes of the input data and of the output data.

In FIG. 5B, the value MG is greater than or equal to 0 and the size of the output data Act(i) from the layer i is greater than the size of the output data Act(i−1) from the preceding layer i−1, and the control means MC determine a first and a second location for the output data of the two elementary memory areas ZA1 and ZA2 as illustrated.

The size of the output data from the layer i does not exceed the upper limit provided by the fourth memory value NTP2 in the elementary memory area ZA1.

Nor does the size of the output data from the layer i fall below the lower limit provided by the first memory value NBT1 in the elementary memory area ZA2.

Consequently, the input and output data of the elementary memory area ZA2 here are juxtaposed which allows a better memory occupation to be obtained. The size of the elementary memory area ZA2 here is greater than the sum of the sizes of the input data and of the output data.

In FIG. 5C, the value MG is strictly less than 0.

The output data from the layer i does not exceed the upper limit provided by the first memory value NTP1 in the elementary memory area ZA1.

Nor does the output data from the layer i fall below the lower limit provided by the first memory value NBT1 in the elementary memory area ZA2.

Consequently, the input and output data of the elementary memory area ZA2 here are juxtaposed which allows a better memory occupation to be obtained. The size of the elementary memory area ZA2 here is greater than the sum of the sizes of the input data and of the output data.

FIG. 6 shows an overview of the steps S2 to S4 for the layers going from i to i+4, with i=1.

The layer i, which here is the first layer of the network, comprises an elementary memory area ZA comprising processed initial input data of the neural network and corresponding to the input data for the layer i+1.

At the layer i+1, the control means MC determine the two locations of the output data of the two elementary memory areas ZA1 and ZA2 associated with the layer i+1.

The size of the elementary area ZA2 here is greater than the sum of the memory sizes of the input and output data of the layer i+1. It can also be seen that the input data and the output data are juxtaposed.

At the layer i+2, the control means MC determine two new elementary memory areas ZA1 and ZA2 from the elementary memory area ZA1 of the layer i+1 and also determine two new elementary memory areas ZA1 and ZA2 from the elementary memory area ZA2 of the layer i+1.

There are accordingly 4 elementary memory areas in the layer i+2.

It may also be seen that, in the two memory areas ZA2 of the layer i+2, the input and output data are juxtaposed and that the size of each elementary memory area ZA2 is greater than or equal to the sum of the memory sizes of the input and output data for the layer i+2.

In certain cases, there may also be an elementary memory area, associated with a layer of the neural network, whose size is equal to the sum of the memory sizes of the input and output data for the layer.

In order not to end up with a large number of elementary memory areas which cannot be managed, restricting the number of elementary memory areas for each layer to N elementary memory areas allows not only the management of the latter to be facilitated but also only the elementary memory areas leading to a good memory optimization of the neural network to be conserved.

N elementary memory areas associated with the layer i+1 may for example be conserved. Since N is settable, here it is chosen to conserve the three smallest elementary memory areas ZA. Another alternative consists in generating N elementary memory areas associated with the layer.

At the layer i+3, the control means MC determine two new elementary memory areas ZA1 and ZA2 from each elementary memory area conserved in the layer i+2. Here, N elementary memory areas ZA, for example 3, may also be conserved. Thus, there are three elementary memory areas conserved instead of 6. The layer i+4 here represents the last layer of the neural network RN.

After having determined the elementary memory areas ZA1 and ZA2 with respect to each elementary area ZA associated with the layer i+3, N elementary memory areas, here 3, may also be conserved. There are accordingly three elementary memory areas conserved instead of 6.

Starting from the elementary memory areas conserved, the control means MC select the elementary memory area having the smallest elementary memory size, here ZG. This elementary memory area ZG has a minimum elementary memory size which corresponds to the overall memory size to be allocated for the neural network.

The control means MC subsequently authorize the calculation unit UC to execute the algorithm, for example the Viterbi algorithm, for going through the layers of the neural network RN from the last layer i+4 to the first layer i and extracting, for each layer, from the location of the determined global memory area ZG, the relative address of each elementary memory area ZA from which the global memory area results. It goes without saying that, if the elementary memory area ZA comprises unprocessed initial input data of the neural network, this amounts to considering the layer i+1 as the first layer of the neural network RN.

In this case, the unprocessed initial data is stored in a single memory area or buffer memory and the two elementary memory areas of the first layer, in this case the layer 2, are determined as indicated hereinbefore. Notably, all that has been described hereinbefore with reference to FIGS. 3, 4, 5A and 5B for a current layer i after the first layer is applicable to this first layer.

FIG. 7 illustrates a flow diagram detailing the step S6 comprising the calculation of the absolute addresses of each elementary memory area ZA selected.

For this purpose, the control means MC determine the relative minimum address between the relative addresses of all the elementary memory areas ZA selected in the step S61 then subtract the minimum value from the other relative addresses of the other elementary memory areas ZA selected in the step S62 in order to generate positive relative addresses.

In the step S63, the calculation unit UC subsequently generates, for each layer, an absolute address by taking into account the positive relative address and the absolute address of the global memory area.

Furthermore, the invention is not limited to these embodiments and their implementations but encompasses all of their variants. By way of example, when the neural network is run, locations of error gradients having a size substantially equal to the size of the output data associated with each layer may be determined.

What is claimed is:

1. A method for determining an overall memory size of a global memory area to be allocated in a memory configured to store input data and output data of each layer of a neural network, the method comprising:
for each current layer of the neural network after a first layer, determining a pair of elementary memory areas based on each preceding elementary memory area associated with a preceding layer, wherein:
two elementary memory areas of the pair of elementary memory areas respectively have two elementary memory sizes,
each of the two elementary memory areas are configured to store input data and output data of the current layer of the neural network,
the output data is respectively stored in two different locations, and
the overall memory size of the global memory area corresponds to a smallest elementary memory size at an output of a last layer of the neural network.

2. The method according to claim 1, wherein at least one of the two elementary memory sizes is greater than or equal to a sum of memory sizes of the input data and the output data of the current layer.

3. The method according to claim 1, further comprising performing an initial processing of initial input data of the neural network, wherein a single elementary memory area of the pair of elementary memory areas is associated with the first layer is configured to store processed initial data corresponding to the input data of a second layer.

4. The method according to claim 1, wherein:
the pair of elementary memory areas determined based on a memory area containing initial input data of the neural network is associated with the first layer, and
the output data from the first layer is respectively stored in two different locations.

5. The method according to claim 1, wherein the input data and the output data of at least one of the two elementary memory areas of each pair are juxtaposed.

6. The method according to claim 1 wherein, for each current layer, determining the two elementary memory sizes of the two elementary memory areas of each pair of elementary memory areas and the location of the output data in the two elementary memory areas depend on a type of the current layer.

7. The method according claim 1, wherein, for each current layer, determining the two elementary memory sizes of the two elementary memory areas of each pair and the location of the output data in these two elementary memory areas depend on a function associated with the current layer.

8. The method according to claim 1, further comprising,
determining the smallest elementary memory size at the output of the last layer of the neural network; and
after determining smallest elementary size at the output of the last layer, determining the global memory area by sequentially extracting a relative address of each elementary memory area for each layer of the neural network with respect to a location of the global memory area, wherein the relative address of each elementary memory is sequentially extracted from the last layer to the first layer.

9. The method according to claim 8, further comprising, for each layer, determining an absolute address of each elementary memory area based its corresponding extracted relative address.

10. The method according to claim 1, wherein, for each current layer after the first layer, N elementary memory areas associated with the current layer having the smallest elementary memory size are conserved.

11. The method according to claim 10, in which N is settable.

12. A device, comprising:
an input configured to receive parameters defining successive layers of a neural network; and
a processor coupled to the input and to a memory, the processor configured to:
determine an overall memory size of a global memory area to be allocated in the memory, wherein the memory is configured to store input data and output data of each layer of the neural network,
determine, for each layer after a first layer of the neural network, a pair of elementary memory areas based on each preceding elementary memory area associated with a preceding layer, wherein
two elementary memory areas of the pair of elementary memory areas respective have a first memory size and a second elementary memory size,
the two elementary memory areas of the pair of elementary memory areas are each configured to store input data and output data,
the output data from each layer is stored in two different locations, and
an overall memory size corresponding to a smallest elementary memory size at an output of the last layer of the neural network.

13. The device according to claim 12, wherein at least one of the first memory size and the second elementary memory size is greater than or equal to a sum of a memory size of the input data and a memory size of the output data.

14. The device according to claim 12, wherein the processor is configured to perform an initial processing of initial input data of the neural network, wherein a single elementary memory area is associated with the first layer comprising the processed initial input data corresponding to the input data for a second layer of the neural network.

15. The device according to claim 12, wherein the pair of elementary memory areas determined based on a memory area containing initial input data of the neural network is associated with the first layer, and the output data from the first layer is respectively stored in two different locations.

16. The device according to claim 12, wherein the processor is configured to juxtapose the input data and the output data of at least one of the two elementary memory areas.

17. The device according to claim 12, wherein for each layer after the first layer, the processor is configured to determining the location of the output data of the two elementary memory areas depending at least on a type of the layer.

18. The device according to claim 12, wherein, for each layer after the first layer, the processor is configured to determine the location of the output data of the two elementary memory areas according to a function associated with the layer.

19. The device according claim 12, wherein, the processor is configured to:
determining the smallest elementary memory size at the output of the last layer of the neural network; and
after determining smallest elementary size at the output of the last layer, determine the global memory area by sequentially extracting a relative address of each elementary memory area for each layer of the neural network with respect to a location of the global memory area, wherein the relative address of each elementary memory is sequentially extracted from the last layer to the first layer.

20. The device according to claim 12, wherein the processor is configured to determine for each layer an absolute address of each elementary memory area based on each extracted relative address.

21. The device according to claim 12, wherein the processor is configured to conserve, for each layer after the first layer, N elementary memory areas associated with the layer having the smallest elementary memory size.

22. The device according to claim 21, wherein N is settable.

23. A microcontroller, comprising the device according to claim 12.

24. A device, comprising:
means for receiving parameters defining successive layers of a neural network;
a memory;
means for determining an overall memory size of a global memory area to be allocated in the memory, wherein the memory is configured to store input data and output data of each layer of the neural network; and
means for determining, for each layer after a first layer of the neural network, a plurality of memory areas based on a memory area associated with a preceding layer, wherein each memory area of the plurality of memory areas has a corresponding memory size, and an overall memory size of the global memory corresponds to a smallest memory size of a memory area of the plurality of memory areas at an output of a last layer of the neural network.

* * * * *